United States Patent [19]
Fischer

[11] 3,899,162
[45] Aug. 12, 1975

[54] MULTI-LOAD SELF-CENTERING WORK HOLDING VISE

[76] Inventor: Hugo J. Fischer, 106 Sherwood Dr., Cary, Ill. 60013

[22] Filed: Sept. 27, 1974

[21] Appl. No.: 509,810

[52] U.S. Cl. ................................................ 269/25
[51] Int. Cl. ............................................ B23q 3/06
[58] Field of Search ............ 269/20, 25, 27, 32, 35, 269/216; 279/1 L

[56] References Cited
UNITED STATES PATENTS

| | | | |
|---|---|---|---|
| 2,679,177 | 5/1954 | Gepfert | 269/35 |
| 3,386,726 | 6/1968 | Lorenz | 269/32 |
| 3,727,772 | 4/1973 | Pauls | 269/25 |

Primary Examiner—Al Lawrence Smith
Assistant Examiner—Robert C. Watson
Attorney, Agent, or Firm—Darbo, Robertson & Vandenburgh

[57] ABSTRACT

The two jaws of a self-centering vise are moved toward and away from each other by respective fluid motors. The adjacent ends of the jaws have faces in the form of an inverted V. A centering pin is positioned between the jaws and has faces parallel to the V faces of the jaws. The centering pin is movable along an axis at right angles to the path of movement of the jaws and is urged into the position between the jaws by a spring. When the jaws move toward each other the jaw faces contact the pin faces to move the pin axially thereof against the resistance of the spring. The movements terminate when the jaws grip the workpiece.

11 Claims, 8 Drawing Figures

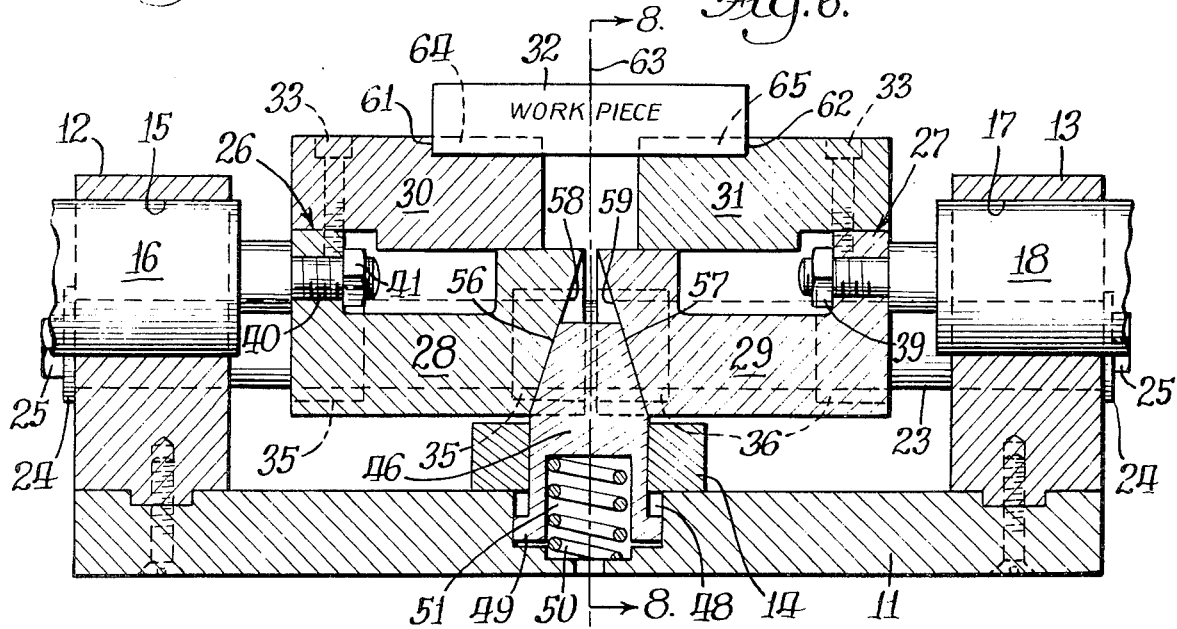

MULTI-LOAD SELF-CENTERING WORK HOLDING VISE

BACKGROUND AND SUMMARY OF THE INVENTION

The utility of many machine tools is improved by having a fixture in the nature of a self-centering vise which can be used to grip workpieces in sequence and hold them at a predetermined location on the machine tool with a high degree of accuracy of positioning. If for no other reason, there is a great saving in labor time, and thus cost, with respect to the mounting of the workpieces on the machine tool. An additional saving occurs when it is necessary to change from the machining of a plurality of workpieces of one configuration to the machining of workpieces of another configuration. The "set-up" time can be substantially reduced by merely exchanging one style of soft jaws for another style of soft jaws, each style being of a configuration to grip a particular workpiece.

Such machine tools might include a planer, a grinder, a multi-spindle milling or drilling machine, etc. Some such machines are very sophisticated in the sense that a substantial number of individual operations are carried out on a single workpiece in response to commands supplied by a magnetic tape, a punched paper tape, etc. Such machines are very expensive and in order to justify their cost it is important that they be kept operating around the clock, with as little down time as possible. Necessarily, the machine must be shut down to change from one style of workpiece to another, but it is important that this unavoidable down time be as short as possible. Even when in the process of working upon a plurality of workpieces of a single configuration, it is important that the change from one workpiece to the next be made as quickly as possible, while, at the same time, not sacrificing the accuracy of positioning each workpiece at the identical location on the machine.

Self-centering vises are known which can be used for this purpose. Perhaps the most commonly used self-centering vise is one wherein each jaw is connected to a rack and the two racks engage a common pinion so as to force the jaws to move in unison. Such a vise is illustrated for example in U.S. Pat. No. 2,679,177. Even when such vises are new, there must be a minimal amount of play in the teeth of the racks and the teeth of the gear so that they operate smoothly and do not bind. Any such play, no matter how small, impairs the accuracy with which the workpiece is positioned. Furthermore, after the substantial amount of opening and closing of the jaws that necessarily occurs in a repetitive operation such as that of the type described above, there is wear in the teeth. That wear further decreases the ability of the vise to accurately position the workpiece.

The present invention pertains to a self-centering vise which will grasp a series of workpieces in sequence and position each of them at a predetermined location with a high degree of accuracy. Furthermore, the vise may be used over a comparatively long period of time (large number of operations) without any wear occuring of a character that will significantly impair the ability of the vise to accurately position the workpiece. Embodiments of the invention are relatively simple to manufacture and are quite inexpensive as compared to the results achieved in time and labor saving in the high volume machining of workpieces.

DESCRIPTION OF THE DRAWINGS

FIG. 5 is an enlarged section as seen at 5—5 0f FIG. 1 with soft jaws mounted on the fixture and showing the jaws open to receive a workpiece;

FIG. 6 corresponds to FIG. 5 except that the jaws have been closed to grip the workpiece;

FIG. 7 is a perspective view of one of the jaws; and

FIG. 8 is a section as viewed at line 8—8 of FIG. 6.

DESCRIPTION OF SPECIFIC EMBODIMENT

Figure 1:
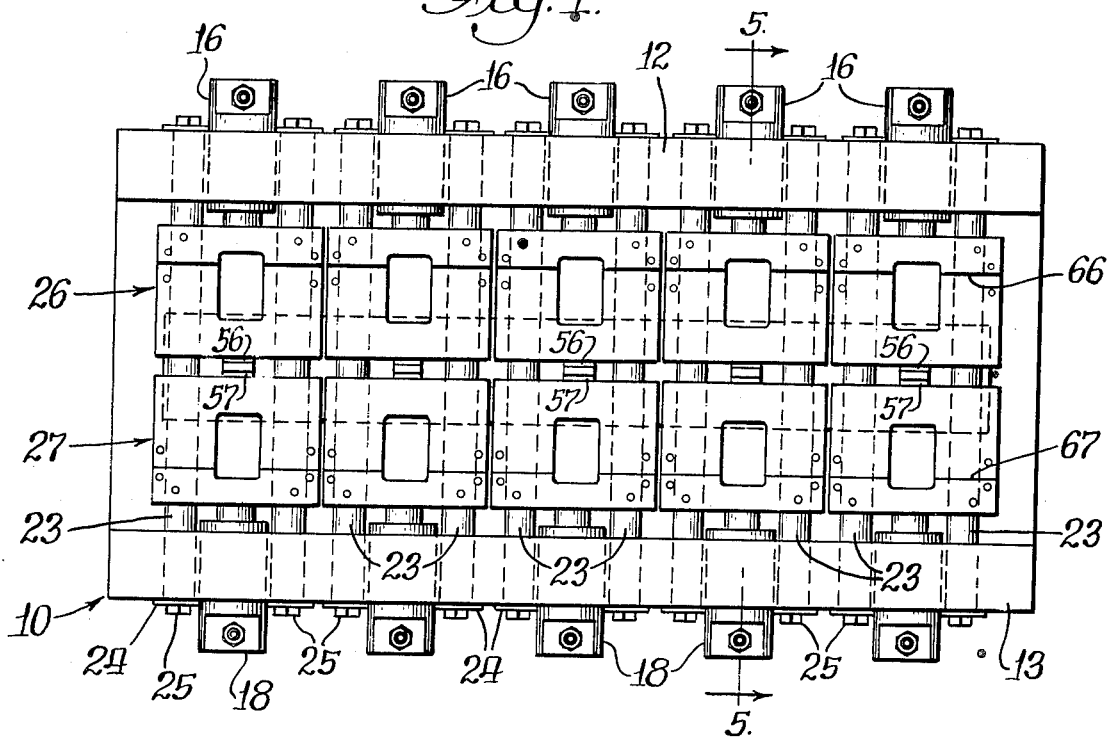
FIG. 1 is a plan view of a fixture for use with a machine tool, which fixture is made up of five self-centering vises embodying the present invention.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

In the illustrated fixture there is a frame, generally 10, which includes a base plate 11, and two sidewalls 12 and 13 immovably secured to the base plate. The sidewalls extend vertically from the top side of the horizontal base plate. Centered between the sidewalls and secured at the top side of the base plate is a guide bar 14. Sidewall 12 has five openings 15 therein to receive five linear fluid motors 16. Sidewall 13 has five identical openings 17 to receive five linear fluid motors 18. Openings 15 and 17 are coaxial. Motors 16 and 18 may be air cylinders or hydraulic cylinders (double acting or spring return).

For each of the five vises, sidewall 12 has a pair of openings 11 and sidewall 13 has a pair of openings 22. The respective openings 21 and 22 are coaxial and are employed to receive guide rods 23. Each guide rod is held in place by means of a washer 24 and a bolt 25 at each end thereof. The bolts are threaded into the guide rods. Mounted on the guide rods are a pair of jaws, generally 26 and 27. Each of these jaws is made up by a permanent jaw 28, 29 and a soft or gripping jaw 30, 31. The soft jaw has a configuration to fit a single particular workpiece 32 and normally will be changed each time a different style of workpiece is employed. The fixed jaw remains as a permanent part of the fixture. The soft jaws are releasably secured to the fixed jaws as by means of bolts 33 threaded into tapped openings 34 in the fixed jaws.

The permanent jaws 28, 29 have bushings 35 and 36 which form bearings for supporting them on the guide rods 23. Thus the movement of the jaws is restricted to a common path defined by the guide rods. Fixed jaw 29 has a tapped opening 37 into which is screwed the threaded end 38 of the piston rod of motor 18. A lock nut 39 is screwed onto the threaded end 38 as an added precaution against that end loosening with respect to the jaw. Similarly, the threaded end 40 of the piston rod of each of motors 16 is received in a threaded opening in jaw 28 and also has a lock nut 41 on the end thereof.

The device for repetitively centering the jaws includes a centering pin, generally 45, having a cylindrical body 46 which is journaled in opening 47 in the guide bar 14. Concentric with opening 47 is an opening 48 in base plate 11. The centering pin has an enlarged head 49 which is trapped in opening 48. A compression spring 50 extends into an opening 51 in the pin with that end of the spring bearing against the pin. The other end of the spring bearing against annular shoulder 52 of the base plate 11. Thus the spring urges the pin upwardly to the position at which enlarged head 49 bears against the guide bar 14, the guide bar acting as a stop. The guide bar is held in place by screws 53 threaded into base plate 11. This construction also permits the assembly of the pin and spring into the opening 48 in the base plate. With a thicker base plate the body 46 can be journaled in the plate per se and the spring 50 retained by a removable cover secured at the bottom of the plate.

The upper end of the centering pin is in the form of a truncated V-shaped wedge which is defined by a pair of faces 56 and 57. The jaws 28 and 29 have a corresponding pair of faces 58 and 59, parallel to the pin faces 56 and 57 respectively.

OPERATION

In most instances a pair of soft jaws 30 and 31 will be produced as dictated by the configuration of the particular workpiece 32 to be machined. These soft jaws will have sidewalls 61 and 62 to grip the opposed sidewalls of the workpiece. These sidewalls are so located with respect to the workpiece and the fixed jaws 28, 29 that when the workpiece is gripped (as hereinafter described) the workpiece will have a predetermined orientation with respect to the center line (longitudinal axis) of the centering pin, which center line is shown by dot-dash line 63. The soft jaws will also have something corresponding to end walls 64 and 65 to position the workpiece in a predetermined orientation in the opposite direction. Of course, the frame 10 will have been located at a predetermined location on the table or bed of the machine tool. Normally, in changing from one job to another this location of the fixture on the machine tool will not be varied. While the user will normally prefer to use soft jaws 30, 31, this is not absolutely necessary since a rectangular workpiece, for example, can be gripped between walls 66 and 67 of the jaws 28, 29 respectively.

Figures 2, 3:
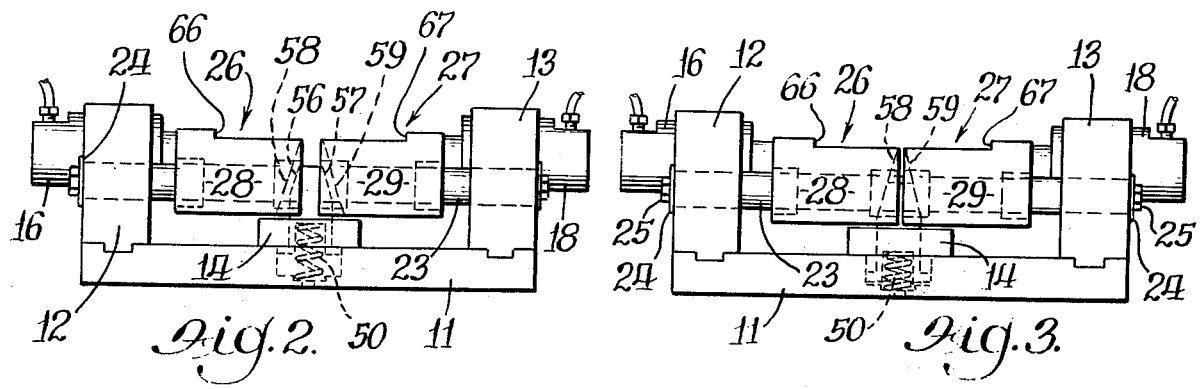
FIG. 2 is an end view of the embodiment of FIG. 1 with the jaws open.
FIG. 3 is a corresponding end view with the jaws closed.
Figure 4:
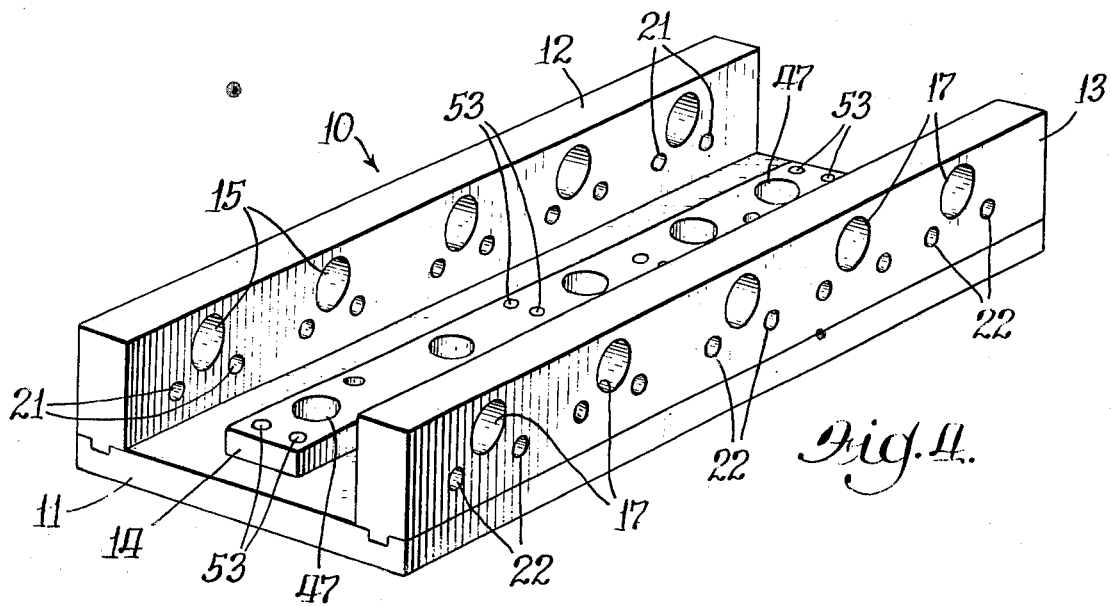
FIG. 4 is an isometric view of the frame of the fixture of FIG. 1.

At the start of the operation, the jaws 26, 27 will be spaced apart, i.e. retracted to the position illustrated in FIGS. 2 and 5. In the illustrated embodiment this will have been performed by retracting springs (not shown) in the single acting motors 16 and 18. I prefer that the jaws 28, 29 actually not lose contact with the pin faces 56, 57 to avoid any battering of the faces. Spacing is shown in FIG. 5 to aid in the illustration and could be used.

The workpiece 32 is now loaded into the cavity defined by walls 61, 62, 64, 65 and the bottom face of the soft jaws. This loading may be done manually or by automatic machinery suitably timed to the operation of the machine. Fluid under pressure is now supplied to motors 16, 18 which results in the respective piston rods moving towards each other. The arrangement is such that the faces 58, 59 of the jaws will contact the faces 56, 57 of the centering pin before the workpiece 32 is securely gripped by sidewalls 61, 62 of the soft jaws. After that contact with the centering pin is made, the jaws 26, 27 continue moving toward each other, this continued movement being permitted by reason of the fact that the contact between faces and 57, 58 and 59 applies a downward force to the centering pin which force overcomes the resistance of spring 50. This causes the centering pin to move downwardly toward the position illustrated in FIG. 6.

Commencing with that contact between the faces 58, 59 of the jaws and the faces 56, 57 of the pin and continuing thereafter, the jaws 26, 27 are equally spaced at each side of center line 63. This will be true even though the action of the motors 16, 18 was such that the jaws 26, 27 were not equally spaced at each side of the center line prior to the time that the face to face contact was made.

Continued movement of the jaws 26, 27 toward each other ultimately results in the FIG. 6 position at which the walls 61, 62 have securely gripped the workpiece 32. When that gripping occurs the presence of the workpiece between the walls 61, 62 blocks further movement of the jaws 26, 27 toward each other even though fluid pressure is maintained on the motors 16, 18. Since the jaws are equally spaced with respect to center line 63, the workpiece will have the desired orientation with respect to this center line.

The workpiece 32 is now machined as required. When that machining operation has been completed, the fluid pressure is withdrawn from the motors 16, 18 permitting the springs (not shown) in the motors to again retract the jaws to the FIG. 5 position. The workpiece is now removed (manually or automatically) and replaced by an identical workpiece to be machined.

With the described embodiment there is no difficulty in maintaining an accuracy of 0.0001 of an inch (0.0025 millimeters) in the positioning of the workpiece with respect to center line 63. This accuracy will be maintained over a long service life because the wear that might affect the accuracy will be a wear of faces 56, 57, 58, 59 and this wear is more in the nature of a honing of the faces which does not impair the accuracy, but may actually increase it. To the extent that wear occurs at this point it is automatically compensated for by spring 50. Other wear will occur (e.g., bushings 36) but this can be controlled. When a high degree of accuracy is desired it is important that the frame be rigid and that no distortion occur as the workpiece is gripped and machined. Thus the sidewalls, 12, 13 must not move with respect to each other and the ways that guide the jaws, e.g. rods 23, must not move (e.g. bend) or permit the jaws to move from their intended path. In some embodiments the rods may be rigidified by the use of center supports forming a part of the frame.

In the illustrated embodiment the "V" defined by faces 56, 57 (or faces 58, 59) has an apex angle of 36°; that is, the angle between face 57, for example, and the axis 63 of the centering pin is 18°. While I believe that 18° is the preferred angle, this may be varied within the range of from about 15° to about 25°. A reduction in the angle can cause insufficient force to be developed to overcome the resistance of spring 50. Too large an angle can result in too much force being developed by a single one of the jaws 26, 27 and thereby an impairment in the centering accuracy. The foregoing would be equally pertinent even though the faces 56, 57, 58, 59 were not planar (as in the described embodiment).

but, instead, were curved, e.g., the top of pin 45 were a truncated cone which would still be a V configuration.

While the foregoing represents the best mode known to me, it will be apparent to those skilled in the art that selfcentering vises can be produced incorporating the present invention without necessarily using the specific components described, but rather using equivalents thereof. For example, devices for imparting movement to the jaws 26, 27 other than the linear fluid motors 16, 18 described can be employed. Similarly, means for applying a resilient force to the centering pin could be substituted for the spring 50. For some applications it may not be necessary to use parallel faces 56, 58 and 57, 59, but instead, for example, a pair of rollers could be employed on the top of the centering pin to contact the faces 58, 59, respectively.

I CLAIM:

1. In a self-centering vise for gripping a workpiece and comprising a frame, a pair of jaws mounted on the frame for movement along a path toward and away from each other, power means connected to the jaws for moving the jaws individually along said path toward and away from each other, and centering means for positioning said jaws, when they grip the workpiece, so that the workpiece is at a specific location along said path, the improvement wherein said centering means comprises:

said jaws having end faces adjacent each other and forming a first pair of faces;

a centering device normally positioned between said end faces and being mounted in said frame for movement only along a line at right angles to said path from said normal position to a displaced position, said centering device having side faces in juxtaposition to said end faces respectively, said side faces forming a second pair of faces;

one of said pair of faces being positioned generally in the form of a V centered with respect to said line, whereby as said jaws move toward each other said end faces contact said side faces and apply a force to said device in a direction tending to move said device along said line toward said displaced position; and means engaging said device and resiliently resisting movement of said device in said direction.

2. In a self-centering vise as set forth in claim 1 and wherein said frame includes a base plate having a side, the improvement comprising:

said jaws being adjacent said side of said base plate, said end faces are said one of said pair of faces, the large end of said V being closer to said side of the base plate than is the small end, and said centering device extending outwardly from said side of the base plate to its position between said end faces.

3. In a self-centering vise as set forth in claim 2, wherein the side faces are generally in the form of a V which has its large end closer to said side of the base plate than is the small end thereof.

4. In a self-centering vise as set forth in claim 3, wherein said means engaging said device is a spring.

5. In a self-centering device as set forth in claim 4, wherein said power means comprises two linear fluid motors, said motors being positioned at said side of said base plate and each being connected to a respective jaw, said frame including means at said side of said base plate and engaging said jaws for guiding said jaws along said path in response to the action of said motors, said frame including an opening having its axis midway between the jaws and at right angles to said path, and said device comprising a pin having a cylindrical stem journaled in said frame opening for movement along said axis, and means engaging said frame to limit the extent that the pin can move in the direction outwardly of said side and toward said jaws.

6. In a self-centering device as set forth in claim 5, wherein behind said opening forming said journal said frame has a larger opening concentric with said axis, said device means engaging said frame comprising an enlarged head on said stem and positioned in said larger opening; and said spring being a compression spring in said larger opening and bearing against said pin and said frame.

7. In a self-centering vise as set forth in claim 1 and wherein said frame includes a base plate having a side, the improvement comprising:

said power means comprises two linear fluid motors, said motors being positioned at said side of said base plate and each being connected to a respective jaw, said frame including means at said side of said base plate and engaging said jaws for guiding said jaws along said path in response to the action of said motors, said frame including an opening having its axis midway between the jaws and at right angles to said path, and said device comprising a pin having a cylindrical stem journaled in said frame opening for movement along said axis, and means engaging said frame to limit the extent that the pin can move in the direction outwardly of said side and toward said jaws.

8. In a self-centering device as set forth in claim 7, wherein behind said opening forming said journal said frame has a larger opening concentric with said axis, said device means engaging said frame comprising an enlarged head on said stem and positioned in said larger opening, and said spring being a compression spring on said larger opening and bearing against said pin and said frame.

9. In a self-centering vise as set forth in claim 8, wherein said frame includes a pair of walls spaced from each other and extending outwardly from said side of said base plate, said walls forming mounts for said motors, said means guiding said jaws comprising a pair of guide rods secured to and extending between said walls, said guide rods being journaled in said jaws.

10. In a self-centering vise as set forth in claim 8, wherein said device has a distal end positioned between said jaws, said side faces are said one of said pair of faces and being adjacent said distal end.

11. In a self-centering vise as set forth in claim 10, wherein said means engaging said device is a spring.

* * * * *

UNITED STATES PATENT OFFICE
CERTIFICATE OF CORRECTION

PATENT NO. : 3,899,162
DATED : August 12, 1975
INVENTOR(S) : Hugo J. Fischer

It is certified that error appears in the above-identified patent and that said Letters Patent are hereby corrected as shown below:

Column 2, lines 14-15, "at 5-5 Of" should read --at line 5-5 of--.
Column 2, line 44, "11" should read --21--.
Column 4, lines 6-7, "and 57, 58 and 59" should read --56,58 and 57, 59--.
Column 4, line 51, the comma after "sidewalls" should be deleted.

Signed and Sealed this fourteenth Day of October 1975

[SEAL]

Attest:

RUTH C. MASON
Attesting Officer

C. MARSHALL DANN
Commissioner of Patents and Trademarks